United States Patent Office 3,325,483
Patented June 13, 1967

3,325,483
INTRODUCING UNSATURATION INTO STEROID COMPOUNDS
Kekhusroo R. Bharucha and Heinrich M. Schrenk, Toronto, Ontario, Canada, assignors to Canada Packers Limited, Toronto, Ontario, Canada
No Drawing. Filed Oct. 23, 1964, Ser. No. 406,194
15 Claims. (Cl. 260—239.55)

This invention relates to a process for introducing unsaturation into steroid compounds, and in particular, to a process for the dehydrosulfonylation of steroid compounds having a sulfonyloxy group attached to a carbon atom to provide unsaturation of the steroid molecule at the carbon atom from which the sulfonyloxy group has been removed. The process is particularly useful in the preparation of $\Delta^{11}$-steroid compounds from corresponding 12-hydroxy steroids, such as desoxycholic acid and derivatives thereof, by sulfonylation and dehydrosulfonylation, but may be used for introducing unsaturation at other positions of the steroid molecule. The process may be used to introduce unsaturation into a side chain having a hydroxyl substituent by sulfonylation-dehydrosulfonylation.

It has been disclosed in co-pending application SN 309,404 filed Sept. 17, 1963, now Patent No. 3,164,616, that potassium tertiary-butoxide in a dipolar aprotic solvent, such as dimethylsulfoxide (DMSO), is an excellent reagent for dehydrosulfonylation of steroidal 12α-sulfonates. Much better yields are obtainable with this reagent than with the best of the earlier-known reagents, such as refluxing collidine or pyridine under pressure. However, for optimum yields the use of potassium tertiary-butoxide is restricted to dipolar aprotic solvents. The superiority of the dipolar aprotic solvents, e.g., dimethylsulfoxide, with potassium tertiary-butoxide is apparently due to the ability of such a solvent to solvate the cation K+, but not the anion.

We have now discovered a more versatile base for dehydrosulfonylation reaction. The present invention resides in the discovery that metal glycolates of long chain monoalkyl ethers of polyethylene glycols, e.g., potassium methoxypolyethylene glycolates, are excellent bases for dehydrosulfonylation of steroidal sulfonates in any solvent medium in which the reactants are soluble to a substantial extent. Metal glycolates of other monoalkyl ethers of polyethylene glycols, such as the ethyl, propyl and butyl ethers, etc., may likewise be employed. It is not necessary to use dipolar aprotic solvents, although these are satisfactory. Non-polar solvents, such as aromatic hydrocarbons, dioxane and other non-hydroxylic solvents commonly used in steroid reactions, in general, are just as satisfactory with this base as dimethylsulfoxide.

The potassium glycolates of long chain monomethyl ethers of polyethylene glycols (potassium methoxypolyethylene glycolates) have the general formula

and are hereinafter sometimes referred to as potassium salts of long chain monomethyl ethers of polyethylene glycols.

With the metal salts of the long chain monoalkyl ethers of polyethylene glycols, an interesting situation prevails. Due to the flexibility of the molecule and multiplicity of oxygen atoms with their lone pair electrons, the metal cation M+ can, in addition to intermolecular solvation, undergo intramolecular solvation so that these glycolates function as strong bases even in the absence of external solvating medium. The selection of the solvent is not limited with the glycolates, the function of the solvent with these reagents, unlike with the potassium tertiary-butoxide, being solely to provide a homogeneous medium for the reaction. This is attested by the fact that dipolar aprotic dimethylsulfoxide and relatively non-polar dioxane give comparable results. The metal salts of long chain monoalkyl ethers of polyethylene glycolates are thus of wider utility, being solvent independent, with the exception of hydroxylic media, and their use is restricted only by solubility consideration. In this respect, the aromatic hydrocarbons are much better solvents for the glycolates than the aliphatic and alicyclic hydrocarbons, e.g., hexane, isooctane, cyclohexane, etc., and where hydrocarbon solvents are to be used, the aromatics are, therefore, preferred.

It is an object of the invention, therefore, to provide an improved process for introduction of unsaturation into the steroid molecule.

Another object of the invention is to provide an improved process for the preparation of $\Delta^{11}$-steroid compounds from corresponding 12-hydroxy steroid compounds.

A further object of the invention is to provide an improved method for dehydrosulfonylation of steroid compounds having a sulfonyloxy group.

A more specific object of the invention is to provide an improved process for the preparation of 3α-hydroxy-$\Delta^{11}$-cholenic acid and its 3α-acyloxy alkyl esters from corresponding 12α-sulfonyloxy derivatives of 3α-hydroxy cholanic acid.

Another specific object of the invention is to provide a process for preparation of 3α-hydroxy-$\Delta^{11}$-pregnene compounds from corresponding 3α-hydroxy-12α-sulfonyloxy pregnane compounds.

The process of the invention in its broad aspects, comprises the dehydrosulfonylation of a steroid compound having a sulfonyloxy group to provide unsaturation of the steroid molecule at the carbon atom from which the sulfonyloxy group has been eliminated by treating said steroid compound with a metal glycolate of a long chain polyethylene glycol monoalkyl ether in the presence of a non-hydroxylic solvent medium.

The metal glycolates or salts of alkoxypolyethylene glycols are readily prepared by reaction of the metal with the methoxypolyethylene glycol in an organic solvent under anhydrous conditions. Thus, potassium metal and the selected alkoxypolyethylene glycol may be heated in dry benzene under reflux conditions until the metal dissolves, following which the solvent is removed as by distillation. The molecular weight of the glycolates may vary widely, e.g., any of the commercially available alkoxypolyethylene glycols sold under the tradename "Carbowax" may be employed. Methoxypolyethylene glycols having average molecular weights in the range of 200 to 1000 have been found to be quite satisfactory, although higher or lower molecular weight polymers may also be used. We have found that the potassium salts of methoxypolyethylene glycols in DMSO are slightly better than potassium tertiary-butoxide in DMSO in the elimination reactions of 12α-arylsulfonates, the yields tending to improve with increasing molecular weight of the base. In other non-hydroxylic media the improvement in yield over K-t-butoxide is quite dramatic, e.g., in aromatic hydrocarbons the yield with K-methoxypolyethylene glycolate is better than 75% whereas with K-t-butoxide the yield is negligible.

The process of the invention has general application to 12-hydroxy steroids and may be applied, for example, to derivatives of ergostane, cholestane, coprostane, sitostane, stigmastane, spirostane, cholane, allocholane, pregnane, allopregnane, androstane and testane. The starting materials can be variously substituted in the nucleus or in the side chain. The starting materials can have any configuration and may also contain double bonds at other positions in the molecule. The invention is especially useful with compounds of the bile acid and spirostane series such as desoxycholic acid and hecogenin, respectively, and derivatives thereof, e.g., derivatives wherein the 17-side chain is —CH(CH$_3$)·CH$_2$CH$_2$·COOH, —CH(CH$_3$)·CH$_2$COOH, —CH(CH$_3$)·COOH, —COOH,

—COCH$_3$, —CH$_2$CH$_3$, —CHOH·CH$_3$

—CH(CH$_3$)·CH$_2$CH=C(C$_6$H$_5$)$_2$

—CH(CH$_3$)·CH$_2$CH$_2$CHOHR where R is alkyl or aryl, —C(CH$_3$)=CHCH=C(C$_6$H$_5$)$_2$ and —C(CH$_3$)=C(C$_6$H$_5$)$_2$. Where the molecule includes carboxylic acid groups, they should be protected, as by esterification, before carrying out the sulfonylation step. Oxo groups, as in the 17-side chain of pregnane compounds, may be ketalized and then regenerated after the dehydrosulfonylation reaction.

The sulfonylating agent can be an aliphatic or aromatic sulfonic acid halide, such as the chloride. Organic sulfonyl chlorides such as alkyl sulfonyl chlorides wherein the alkyl radical contains from 1 to 12 carbon atoms, or aryl sulfonyl chlorides wherein the aryl group is either unsubstituted or substituted can be satisfactorily used. Representative examples of suitable organic sulfonylating agents are para-toluenesulfonyl chloride, benzenesulfonyl chloride and methanesulfonyl chloride. Inorganic sulfonylating agents, e.g., chlorosulfonic acid, likewise, may be useful.

Hydroxyl groups in other parts of the steroid molecule may be protected by formation of tetrahydropyranyl ether or by conversion into acyloxy groups, for example, acetoxy, propionoxy or benzoyloxy groups, and as aforementioned, acid groups are conveniently converted into the corresponding esters. Thus, where the starting material is desoxycholic acid and $\Delta^{11}$ is the only unsaturation desired, it is first converted into the 3α-acyloxy-12α-hydroxy-cholanate.

The conditions under which the sulfonylation of the hydroxy group may be carried out are, in general, known to the art. It is preferred to use pyridine as the solvent medium for such reaction. Sulfonylation with sulfonyl chlorides in pyridine at temperatures of 30° to 60° C. provides good results, but it should be realized that the temperature is not sharply critical. The amount of sulfonylating agent is not particularly critical and, in general, any excess over the theoretical may be used.

It is not necessary that the steroidal sulfonate be isolated from the reaction mixture in pure form prior to the dehydrosulfonylation reaction. The crude material may be satisfactorily used in the next step.

The dehydrosulfonylation reaction takes place quite readily at temperatures of about 80 to 110° C. to provide substantially complete dehydrosulfonylation within about an hour's time. The time of the reaction may vary with the particular sulfonyloxy group being eliminated and with the particular steroid and reagent. In general, shorter times are required with steroids having short side chains at C-17. For example, it is complete within about 10 minutes with 3α-ethyloxycarbonyloxy-12α-benzenesulfonyloxy-pregnan-20-one ethylene ketal at such temperature. It will be understood that time and temperature can be readily adjusted by those skilled in the art to the optimum conditions for the particular compound being treated. Substantially complete dehydrosulfonylation will take place at room temperature if the reaction mixture is allowed to stand for sufficient length of time. In general, however, temperatures of about 40 to 120° C. are preferred.

The following specific examples are further illustrative of the invention. Whenever possible operations were carried out in an atmosphere of dry nitrogen under anhydrous conditions. Optical rotations were measured in alcohol free chloroform and ultraviolet spectra in ethanol.

*Example 1.—3α-hydroxy-12α-benzenesulfonyloxy-cholanic acid*

A solution of methyl 3α-acetoxy-12α-benzenesulfonyl-oxycholanate (3.0 g.; E $^{1\%}_{1cm.}$ 217.5 m$\mu$=130)

prepared as described in the co-pending application No. 309,404, and 85% KOH (0.84 g.) in methanol (45 cc.) and water (3 cc.) was kept at room temperature for 16 hours. After removal of bulk of solvent in vacuo at 35–40° C. (bath temperature), the residue was treated with water and dilute (10%) HCl. After refrigeration for 24 hours, the colorless solid was filtered off, washed with water and dried at 45° C./10 mm. Weight: 2.584 g. (95%)

E $^{1\%}_{1cm.}$ 217 m$\mu$=144

Crystallization from ether furnished pure 3α-hydroxy-12α-benzenesulfonyloxy-cholanic acid, M.P. 134–135° C., [α]$_D^{25}$+56.82° (C=1.0), λ$_{max}$ 217 m$\mu$ ($\epsilon_{max}$ 9,100).

*Analysis.*—Found: C, 67.90; H, 8.36; S, 5.96%. C$_{30}$H$_{44}$O$_6$S requires: C, 67.64; H, 8.33; S, 6.02%.

*Example 2.—Preparation of methyl 3α-acetoxy-$\Delta^{11}$-cholenate (K salt of methoxypolyethylene glycol–550 in DMSO)*

A mixture of 14.0 g. methoxypolyethylene glycol having an average molecular weight of about 550 (Carbowax 550), 1.02 g. potassium metal and 6 cc. of freshly distilled benzene was stirred while being heated in an oil bath at a temperature of 75 to 80° C. After about 4½ hours, all of the metal had reacted. The solvent was then evaporated in vacuo, leaving the potassium salt of the methoxypolyethylene glycol as a light brown gum (ca. 15 g.).

To a solution of 4.7 g. of the above potassium methoxypolyethylene glycolate in 8 cc. of anhydrous dimethylsulfoxide, 1 g. of 3α-hydroxy-12α-benzenesulfonyloxy-cholanic acid was added and the mixture, while being stirred, was heated in an atmosphere of nitrogen at 100–105° C. (bath temperature) for 1 hour. The steroid dissolved immediately, forming a brown solution from which crystallization commenced within about 5 mins. The reaction mixture was cooled, water and dilute HCl were added to provide a pH of 2 and the precipitate, resulting after refrigeration overnight, was filtered off. 0.70 g. of a colorless solid was recovered, representing a substantially quantitative yield of 3α-hydroxy-$\Delta^{11}$-cholenic acid, M.P. 162–163° C. (147° C. sinters). Thin layer chromatography (TLC) (top layer of 15 toluene: 10 AcOH: 1 H$_2$O system) showed essentially one spot. No absorption maximum in the 214–340 m$\mu$ region.

0.698 g. of the above solid was methylated with ethereal diazomethane, the solution evaporated to dryness in vacuo and the residue acetylated at room temperature overnight with 1.5 cc. of pyridine and 1.3 cc. of acetic anhydride. On gradual addition of water, the product crystallized out and after acidification with dilute HCl and refrigeration, was filtered off. Methyl 3α-acetoxy-$\Delta^{11}$-cholenate was recovered as a pale yellow solid: 0.785 g. (98% yield), M.P. 115–120° C. (112° C. sinters). Recrystallization of this material from methanol gave pure methyl 3α-acetoxy-$\Delta^{11}$-cholenate as colorless crystals in 92% yield, M.P. 120–122° C. TLC (25 EtOAc, 75 cyclohexane) showed a single spot. This represents an overall yield of 89.5% based on the starting benzenesulfonate.

*Example 3.—K salt of methoxypolyethylene glycol–350 in dioxane*

The process of Example 2 was repeated with 2 g. of 3α-hydroxy-12α-benzenesulfonyloxy cholanic acid and 6.15 g. of the potassium salt of a methoxypolyethylene glycol having an average molecular weight of about 350 (Carbowax 350) in 10 cc. of dioxane. 3α-hydroxy-$\Delta^{11}$-cholenic acid was obtained in substantially quantitative yield and after methylation and acetylation, as in Example 2, provided methyl 3α-acetoxy-$\Delta^{11}$-cholenate in quantitative yield. After chromatography over Florisil and crystallization from methanol, a pure product having a melting point of 118–120° C. was obtained, the overall yield from the starting benzenesulfonate being 79%.

*Example 4.—K salt of methoxypolyethylene glycol–550 in toluene*

The process of Example 2 was repeated using 0.72 g. of 3α-hydroxy-12α-benzenesulfonyloxy cholanic acid and 3.41 g. of the potassium salt of Carbowax 550 in 7 cc. of toluene. Again, substantially complete dehydrosulfonylation was accomplished within an hour. After methylation and acetylation of the product, methyl 3α-acetoxy-$\Delta^{11}$-cholenate was obtained in 98% yield from the starting material. Crystallization from methanol provided a pure product having a melting point of 119–120° C. in 75% overall yield.

*Example 5.—K salt of methoxypolyethylene glycol–750 in dioxane*

The procedure of Example 2 was repeated using 2 g. of the same 12α-benzenesulfonate starting material and 13.68 g. of the potassium salt of a methoxypolyethylene glycol having an average molecular weight of about 750 (Carbowax 750) in 10 cc. of dioxane. Substantially complete dehydrosulfonylation was accomplished within an hour to provide a product which, on methylation and acetylation, gave crude methyl 3α-acetoxy-$\Delta^{11}$-cholenate in 97% yield from the starting material. After crystallization from methanol, a pure product having a melting point of 118–120° C. was obtained in 87.5% yield based on the steroid starting material.

*Example 6.—3α-hydroxy-12α-tosyloxy-cholanic acid*

Methyl 3α-acetoxy-12α-tosyloxy-cholanic acid, prepared as in co-pending patent application No. 309,404, was saponified as in Example 1 above to give crude 3α-hydroxy-12α-tosyloxy-cholanic acid $$E^{1\%}_{1\,cm.}\ 225\ m\mu = 204$$

in 98% yield. Crystallization from ether gave pure tosylate, M.P. 135–136° C., $[\alpha]_D^{25} +55.26°$ (c.=1.0), $\lambda_{max}$ 225 m$\mu$ ($\epsilon_{max}$ 12,230).

*Analysis.*—Found: C, 68.36; H, 8.53; O, 17.73; S, 6.05%. $C_{31}H_{46}O_6S$ requires: C, 68.10; H, 8.48; O, 17.56; S, 5.86%.

*Example 7.—K salt of methoxypolyethylene glycol–550 in DMSO*

The procedure of Example 2 was repeated using 1 g. of 3α-hydroxy-12α-tosyloxy-cholanic acid and 4.6 g. of the potassium salt of Carbowax 550 in 8 cc. of dimethylsulfoxide. Substantially complete dehydrotosylation occurred within 1 hour. The product after methylation and acetylation provided crude methyl 3α-acetoxy-$\Delta^{11}$-cholenate, M.P. 112–118° C., in quantitative yield which, after recrystallization from methanol, provided a pure product having a melting point of 119–121° C. in 91% overall yield from the starting material.

*Example 8.—K salt of methoxypolyethylene glycol–350 in DMSO*

7.0 g. of Carbowax 350, 0.77 g. of potassium metal and 5 cc. of dry benzene were stirred and heated under reflux until all of the metal dissolved. The solution was then heated in vacuo at 50–60° C. to remove all of the solvent. The resultant potassium methoxypolyethylene glycolate, 7.88 g., obtained as a brown gum, was dissolved in 10 cc. of dimethylsulfoxide and was mixed with 2.5 g. of crude 3α-hydroxy-12α-benzenesulfonyloxy-cholanic acid (purity approximately 85%) in 5 cc. of dimethylsulfoxide. The mixture was stirred and heated at 95–100° C. (bath temperature) for 1 hour. Isolation of the product, 3α-hydroxy-$\Delta^{11}$-cholenic acid, as a brownish solid was accomplished by pouring the reaction mixture into water and acidifying with HCl. A portion of this solid was methylated with ethereal diazomethane and was then acetylated with pyridine-acetic anhydride at room temperature overnight. Isolation of the product with ether gave crude methyl 3α-acetoxy-$\Delta^{11}$-cholenate. This product was purified by Florisil chromatography and crystallized from methanol to give a colorless solid, melting point 116–119° C. TLC showed a single spot. The overall yield of the pure methyl 3α-acetoxy-$\Delta^{11}$-cholenate was 77% based on the starting benzenesulfonate excluding a second crop of about 8% of less pure product.

*Example 9.—K salt of methoxypolyethylene glycol–350 in benzene*

The procedure of the foregoing example was repeated using 5.70 g. of potassium methoxypolyethylene glycolate (the potassium salt of Carbowax 350), 1.8 g. of crude 3α-hydroxy-12α-benzenesulfonyloxy-cholanic acid (85% pure) and 12 cc. of dry benzene. The mixture was stirred and heated under reflux (bath temperature 85–90° C.) for 2 hrs. After recovery of the crude acid (3α-hydroxy-$\Delta^{11}$-cholenic acid), methylation and acetylation, followed by Florisil chromatography and crystallization from methanol, methyl 3α-acetoxy-$\Delta^{11}$-cholenate, melting point 115–117° C., was recovered in an overall yield of 75% based on the starting benzenesulfonate.

*Example 10.—Preparation of 3α-hydroxy-$\Delta^{11}$-pregnen-20-one ethylene ketal (K salt of methoxypolyethylene glycol–550 in DMSO)*

0.439 g. of 3α-ethyloxycarbonyloxy-12α-benzenesulfonyloxy-pregnan-20-one ethyleneketal and 2.2 g. of potassium methoxypolyethylene glycolate (prepared from Carbowax 550) in anhydrous dimethylsulfoxide was stirred and heated at 95–105° C. (bath temperature) for 10 mins. The solution was then cooled, water was added, followed by dilute HCl (10%) to lower the pH to around 8. After refrigeration overnight, crude 3α-hydroxy-$\Delta^{11}$-pregnen-20-one ethylene ketal was recovered by filtration as a pale yellow solid (0.271 g., 99% of the theoretical yield), M.P. 138–140° C. (137° C. sinters). This product had no absorption maximum in the 214–310 m$\mu$ region indicating completion of the dehydrobenzenesulfonylation. TLC (70 EtOAc, 30 cyclohexane) showed essentially one spot. On crystallization of the crude material from aqueous methanol pure 3α-hydroxy-$\Delta^{11}$-pregnen-20-one ethylene ketal was recovered, M.P. 135–136° C., $$[\alpha]_D^{26} +26.41°$$

*Analysis.*—Found: C, 74.55; H, 10.12%. $C_{23}H_{36}O_3,O.5H_2O$ requires: C, 74.75; H, 10.09%.

TLC showed a single spot. This represents an overall yield from the starting material of 91.5%.

Similar procedure using the same starting material, but with potassium tertiary-butoxide in anhydrous dimethylsulfoxide provided pure 3α-hydroxy-$\Delta^{11}$-pregnen-20-one ethylene ketal, M.P. 133–135° C. in an overall yield of 89%.

Likewise, dehydrotosylation of 3α-ethyloxycarbonyloxy-12α-tosyloxy-pregnan-20-one ethylene ketal with the potassium salt of Carbowax 550 in dimethylsulfoxide furnished pure 3α-hydroxy-$\Delta^{11}$-pregnen-20-one ethylene ketal, M.P. 134–135° C. in ca. 91% yield.

The 3α-ethyloxycarbonyloxy-12α-hydroxy-pregnan-20-one ethylene ketal starting material for the foregoing example was prepared by cathylation of 3α,12α-dihydroxy-pregnan-20-one ethylene ketal using ethyl chlorocarbonate in pyridine. Pure 3α-ethyloxycarbonyloxy-12α-hydroxypregnan-20-one ethylene ketal (M.P. 132–134° C., $[\alpha]_D^{25} +50.6°$), was obtained by chromatography over Florisil. This was treated with benzenesulfonyl chloride in pyridine at about 40° C. for 96 hrs., and after crystallization of the product from ether-hexane provided 3α- ethyloxycarbonyloxy-12α-benzenesulfonyloxy-pregnan-20-one ethylene ketal, M.P. 135° C. decomp., $[\alpha]_D^{25}+57.05°$, $\lambda_{max}$ 217 mμ (ε 9,100), in about 90% yield.

In a similar manner, 3α-ethyloxycarbonyloxy-12α-tosyloxy-pregnane-20-one ethylene ketal, M.P. 126–127° C., $[\alpha]_D^{24}+61.9°$, $\lambda_{max}$ 225 mμ (ε 13,000), was prepared.

It will be understood that the processes of the foregoing examples may be repeated with other starting materials with such necessary modifications as will be apparent to those skilled in the art. For example, with hecogenin the 12-keto group is reduced to a 12-hydroxy function which is then sulfonylated and dehydrosulfonylated.

We claim:

1. A process for the dehydrosulfonylation of a steroid compound having a C–12 sulfonate ester group to provide Δ¹¹-unsaturation comprising treating said steroid compound with a metal glycolate of a long chain polyethylene glycol monoalkyl ether in the presence of a non-hydroxylic solvent.

2. The process of claim 1 wherein said steroid compound is treated with a potassium glycolate of a methoxypolyethylene glycol having an average molecular weight in the range of from about 200 to 1000.

3. The process of claim 1 wherein said solvent comprises an aromatic hydrocarbon.

4. The process of claim 1 wherein said solvent comprises benzene.

5. The process of claim 1 wherein said solvent comprises toluene.

6. The process of claim 1 wherein said solvent comprises dimethylsulfoxide.

7. The process of claim 1 wherein said solvent comprises dioxane.

8. The process of claim 1 wherein the steroid compound subjected to dehydrosulfonylation is a 12α-benzenesulfonyloxy-steroid compound.

9. The process of claim 1 wherein the steroid compound subjected to dehydrosulfonylation is a 12α-tosyloxy-steroid compound.

10. The process of claim 1 wherein the steroid compound subjected to dehydrosulfonylation is a 12α-sulfonyloxy-steroid of the cholane series.

11. The process of claim 1 wherein the steroid compound subjected to dehydrosulfonylation is a 12α-sulfonyloxy-steroid of the pregnane series.

12. A process for the preparation of 3α-hydroxy-Δ¹¹-cholenic acid comprising heating 3α-hydroxy-12α-sulfonyloxy-cholanic acid with a potassium glycolate of a long chain polyethylene glycol monomethyl ether in the presence of a non-hydroxylic solvent.

13. A process for the preparation of a Δ¹¹-pregnene compound comprising heating a pregnan-20-one ethylene ketal having a 12α-sulfonyloxy group with a potassium glycolate of a long chain polyethylene glycol monomethyl ether in the presence of a non-hydroxylic solvent medium to accomplish dehydrosulfonylation.

14. The process of claim 11 wherein the pregnan-20-one ethylene ketal is a 3α-carbethoxy-12α-benzenesulfonyloxy-pregnan-20-one ethylene ketal and the product of the dehydrosulfonylation reaction is 3α-hydroxy-Δ¹¹-pregnen-20-one ethylene ketal.

15. In a process for introducing Δ¹¹-unsaturation into a steroid compound having a 12α-hydroxy group by sulfonylation to provide a 12α-sulfonyloxy group followed by dehydrosulfonylation, the improvement comprising carrying out said dehydrosulfonylation with a potassium glycolate of a long chain polyethylene glycol monoalkyl ether in a non-hydroxylic solvent.

References Cited
UNITED STATES PATENTS 3,164,616   1/1965   Bharucha _____ 260—397.1

LEWIS GOTTS, *Primary Examiner.*

ELBERT L. ROBERTS, *Assistant Examiner.*